Dec. 13, 1938. J. B. O'CONNOR Re. 20,949

FOLDING TABLE TOP

Original Filed Jan. 30, 1928

Inventor:
John B. O'Connor
By:- Cox & Moore
attys.

Reissued Dec. 13, 1938

Re. 20,949

UNITED STATES PATENT OFFICE 20,949

FOLDING TABLE TOP

John B. O'Connor, Aurora, Ill., assignor to Lyon Metal Products Incorporated, Aurora, Ill., a corporation of Illinois Original No. 1,934,372, dated November 7, 1933, Serial No. 483,400, September 22, 1930, which is a division of Serial No. 250,462, January 30, 1928, now Patent No. 1,879,945, dated September 27, 1932. Application for reissue November 30, 1934, Serial No. 755,443

17 Claims. (Cl. 311—108)

My invention relates in general to tables and has more particular reference to a table having an improved top and pivoted legs adapted to fold up within the zone of the table top, whereby the table may be collapsed into small compass for storage purposes and to be extended to open position substantially normal to the plane of the table.

One object of the invention, is the provision of an improved table rim, of simplified construction, providing a seat in which the table top may be arranged and a flange to which the legs may be attached and within the zone of which the legs may be folded.

Another object of the invention is the combination of the novel table rim and hinged leg in a folding leg table of a simplified construction, whereby to produce a sturdy, yet cheap folding table having a sightly appearance and capable of giving satisfactory operation over a long period of service.

Still another object of the invention is to provide a table having a rim comprising a single strip of sheet metal, suitably folded to provide a continuous rim or edge for the table top and having means to support a table top within the rim.

A still further object of the invention resides in providing a table top comprising a flat member or board of relatively weak material and a strengthening and reinforcing rim made of a strip of sheet metal having a portion folded to form a strong tubular bead encircling the edge of the flat member.

A still further object resides in fastening the central board of the table top in the strengthening rim by invisible means, which is accomplished by providing a flange or flanges extending inwardly of the rim for supporting the central board in the rim and fasteners set in the edges of the board and taking into the flanges.

Numerous other objects and advantages of the invention will be apparent as the invention is better understood from the following description which, taken in connection with the accompanying drawing discloses a preferred embodiment of the invention.

Referring to the drawing.

Figure 1:
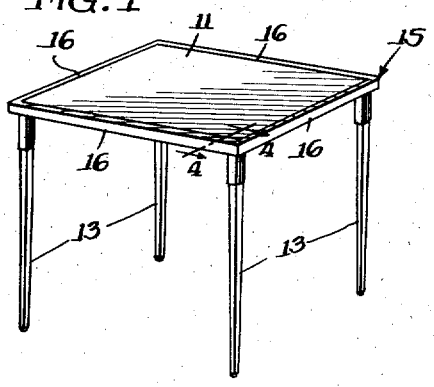
Figure 1 is a perspective view of a table embodying my invention showing the legs in open position.

To illustrate my invention, I have shown on the drawing a folding leg table having a top 11 and separating legs 13 pivotally mounted to the table top being adapted to be arranged in substantially normal open position or to be folded within the zone of the table top to form a compact folded table when not in use.

Figure 4:
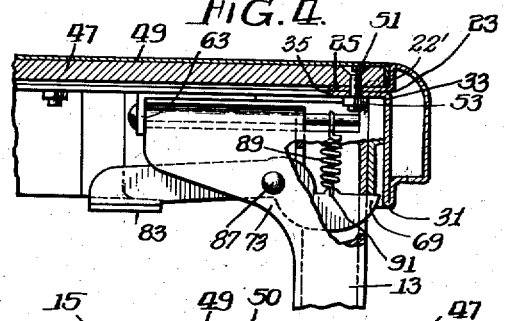
Figure 4 is a vertical cross section taken substantially along the line 3—3 in Figure 1.
Figure 6:
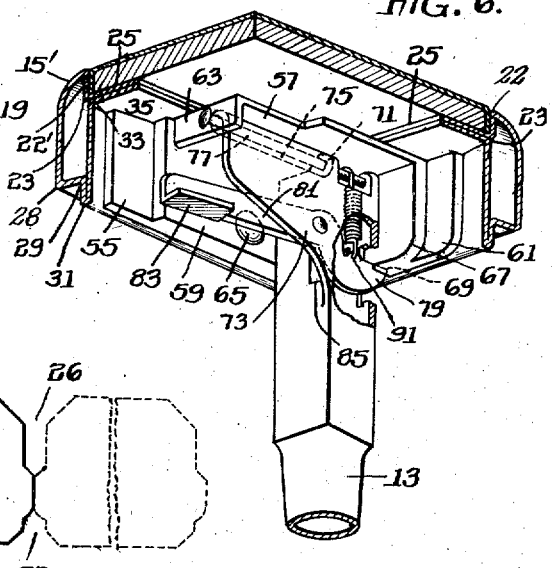
Figure 6 is a perspective view of the corner of the table structure shown in Figure 4 illustrating a preferred leg structure and manner of attachment of the folding leg structure, including its supporting bracket, in the frame.
Figure 2:
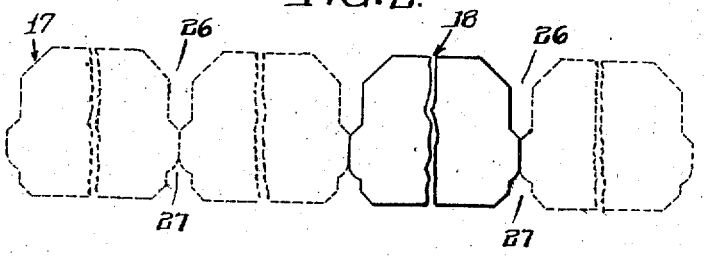
Figure 2 is a flat development of the strip from which the modified form of rim of the table top shown in Figure 5, is made.

The table top comprises a peripheral rim 15, which is preferably built up from tubular members 16 formed by welding or otherwise securing together suitably folded strips of sheet metal 18 configurated as shown in solid lines in Figure 2 of the drawing, or the rim may be formed from a single strip of material 17 configurated as indicated in dotted lines in Figure 2. The body of the rim lies at a substantially vertical plane and the upper edges of the rim strip are bent inwardly as at 15′ to form a rounded corner. The upper edge is thence bent vertically downwards along a line of bend 22 as in Figures 4 and 6, to form a vertical portion 22′, thence normally inwards along a line of bend 23 to provide a ledge 25. The lower edges of the strip are bent inwardly at right angles to the main body of the strip along a line of bend 28, thence downwardly parallel with the plane of the main body along a line of bend 29, then backwardly along the line of bend 31 and thence upwardly to the ledge 25. The extreme lower edge portions are finally bent inwardly along a line of bend 33 to provide a ledge 35 parallel and adjacent to the ledge 25 which ledges are secured together as by welding or any other convenient means to provide an annular table top supporting flange.

In the modified form of my invention I may strengthen this flange, if desirable, by extending this ledge 35 inwardly beyond the inner edge of a ledge 25 and fold the extended ledge portion over to enclose the outer edges of the ledge 25, said folded portion being secured to the ledge 25 by spot-welding or any convenient manner.

Figure 3:
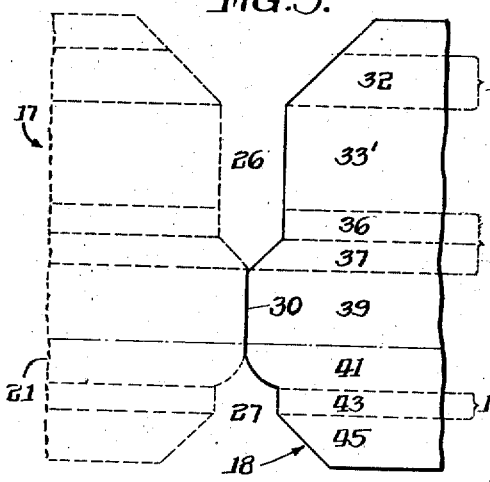
Figure 3 is an enlarged view of a section of the strip shown in Figure 2.
Figure 5:
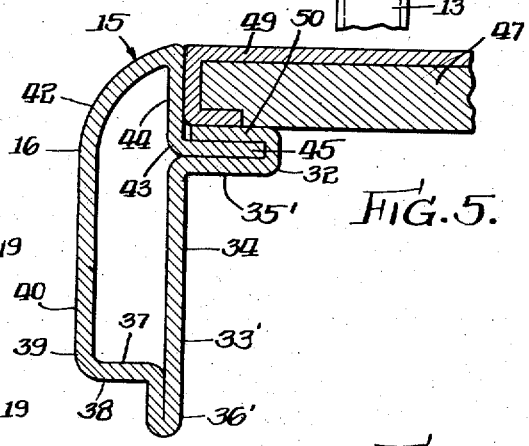
Figure 5 is a detail sectional view of a modification of the improved rim and showing the manner in which the top is supported thereby.

In making the modified form of fold shown in Figure 5, the strips 18 or strips 17 are folded along the lines 19, illustrated to the right in Figure 3, and the curled plane 21, illustrated to the left in Figure 3, to form the tubular member substantially as indicated in Figure 5. The strip 17, as shown in Figure 3, from which the tubular member is formed, is also preliminarily notched before bending as shown at 26 in Figure 3, in its upper edge and 27 in its lower edge to permit the tubular member to be bent as at 30 to form a square table rim. Where individual strips 18 are used, the ends of the tubular members formed therefrom are abutted and welded together to form the rim. The upper extremity 32 of the strip, as shown in Figure 3, forms an inwardly extending flange 35' of the modified form of finished rim shown in Figure 5. Below the portion 32 of the strip is a wide portion 33' which, in the finished rim, extends downwardly of the flange and forms a vertical inner wall 34. Below the portion 33' in the strip, a narrow portion 36 is folded back upon the lower edge of the portion 33' to form a strengthening flange 36' in the finished rim. Adjacent the portion 36 of the strip a portion 37 is bent outwardly to form the bottom wall 38 of the tubular rim. Adjacent to and integrally connected with the portion 37 of the rim strip, a portion 39 extends upwardly to form the outer or exterior wall 40 of the tubular member. A part of the portion 39 is curled as at 41, Figure 3, to form a rounded shoulder 42, shown in Figure 5, in the upper outer edge of the tubular rim. The portion 43, Figure 3, is bent downwardly to form the inner upper edge 44 of the tubular member and is bent to provide an edge 45 which projects inwardly and extends parallel to and engages the flange 32. In this modification of the invention this lower flange 32 is extended and folded over the upper flange as shown at 50 in Figure 5 to add additional strength to the structure.

The table top, in the illustrated embodiment, is square and consists of a flat relatively thin board-like member 47 which may be formed of any suitable material and a suitable ornate cover sheet 49, which is preferably tightly stretched across the upper surface of the member 47 with its edges wrapped and secured to the edges of the member 47. The table top member 47 is arranged in the seat formed by the flange and the wall portion 22' or 44 in Figs. 4 and 5, respectively, of the tubular member 16 and may be secured to position therein by convenient fastening means comprising, in the illustrated embodiment, a threaded bolt 51, the head of which is mounted in the table top and having a threaded shank extending downwardly through suitable perforations formed in the flange and secured in place against withdrawal by means of nut 53. It will be noted that the fastening means is entirely hidden from view, the cover 49 extending over the heads of the bolts 51 thus providing a neat and sightly table when viewed from above.

The legs 13 may be attached to the table top in any convenient manner, but I prefer to pivot the legs to the rim 15 at each of the four corners of the table and to so pivot the legs that when folded they extend entirely within the zone of the tubular member 16. To this end, the legs are pivotally mounted in brackets 55, which in turn are secured to the inner surface of the rim beneath the top supporting ledge. Each bracket is preferably formed from a single strip of metal suitably cut and bent to provide a top 57 from which a side 59 and an end 61 are bent at right angles. The edge of the top opposite the end 61 is also bent downwardly to provide a flange 63. The side 59 is formed at its lower edge with an off-set projection or button 65 and the end 61 is formed to provide a struck-out cam surface 67. The lower end of this cam portion is provided with a notch 69. The bracket is preferably secured to the table with its upper surface 57 engaging the lower surface of the inwardly extending flange of the tubular member, its side 59 and end 61 engaging the inner wall of the tubular member. The bracket portions 57, 59 and 61 may be secured to the table rim by any convenient means, although I prefer to employ spot-welding to secure the parts together.

The legs 13 preferably comprise tubular members having a substantially square cross section at their upper ends. Each leg is provided with upwardly extending ears 71, at its upper end, provided with aligned apertures, said ears being formed in opposite sides of the leg adjacent one side thereof, said adjacent side being extended to form a lateral flange 73, which flange has an upper edge 75 curled over to form a journal, the axis of which is in alignment with the apertures formed in the ears 71. The journal and ears are adapted to receive a rod or pin 77, which extends through perforations formed in the flange 63 and end wall 61 of the bracket. The ends of the rod 77 are preferably riveted in place in the bracket. This arrangement insures a substantially elongated hinge for the leg, which prevents it from wobbling in the plane of the axis of the hinge. The parts are so arranged that the leg when in open position is arranged in the corners of the table and when in folded position extends parallel with the side of the rim to which the ends 61 of the bracket it attached. A similar bracket is attached at the adjacent corner of the rim with its side 59 secured opposite the lower end of the leg when in folded position and the projection 65 thereof is then in position to co-operate with the lower end of the folded leg to secure it in folded position, the resilience of the leg permitting it to be sprung over the protuberance, which thereupon engages beneath the leg and maintains the same in folded position within the zone of the rim.

Any suitable means may be employed to secure the leg to the table in open position, but I prefer to employ an improved latch construction comprising a detent arranged in the upper portions of the leg to co-operate with the notch 69 in the bracket, which operates as a latch keeper. The detent comprises an arm formed from a metal strip and having a nose 79, a body 81 and a handle 83. The body of the detent and the nose thereof are arranged through slots 85 formed in the side walls of the leg vertically below the ears 71 thereof, and the body of the detent is pivoted to the base of the flange 73 by means of a pin 87, the handle 83 extending beyond the lower edge of the flange 73 in position to be operated to release the leg for folding. The nose of the detent is normally urged in an upward direction, that is to say, toward the axis of the hinge by means of a spring 89 secured as at 91 to the body of the detent within the leg, the other end of the spring being secured to the hinge pin 77. When the leg is in open position, the nose of the detent registers with the notch 69 and engages therein under the influence of the spring. When it becomes necessary or desirable to fold the legs into the zone of the rim, the detent may be released from the notch by pressing upwardly on the handle 83, which is conveniently arranged adjacent the lower edge of the rim. This operation releases the detent from the notch, whereupon the leg may be swung to folded position, the detent sliding along the cam surface 67. The end of the leg may be sprung behind the protuberance 65 of the adjacent bracket.

When it is desired to open the leg, the lower end is sprung from behind the protuberance and the leg is then swung to open position, the nose 79 of the detent riding upon the cam surface 67 and being guided thereby into registration with the notch 69.

The table of my invention offers numerous advantages, amongst which combination of lightness and strength is of great importance. In tables of this characteristic, rigidity when the legs are in open position is highly important, since a wobbly table is undesirable and in many instances useless. My improved construction, particularly the tubular nature of the rim imparts lightness, while the internal flange and the downwardly extending walls impart strength, and the outer curled wall imparts beauty in the table rim. The rim also provides a zone within which the table legs can be folded out of sight and the construction, where the member 47 is secured at its edges in a depressed seat, permits the same to be fastened in place by concealed fastening members, all of which combines to provide a product of surpassing beauty.

It is thought that the invention and numerous of its attendant advantages will be understood from the foregoing description and it is obvious that numerous changes may be made in the form, construction, and arrangement of the several parts without departing from the spirit or scope of my invention or sacrificing any of its attendant advantages, the form hereinbefore described being a preferred embodiment for the purpose of illustrating my invention.

I do not claim herein the subject matter of invention claimed in my co-pending application Serial No. 250,462, filed January 30, 1928, now Patent No. 1,879,945 of September 27, 1932, of which the present application comprises a division.

Having thus described my invention, what I claim as new and desire to secure by Letters Patent is:

1. A table comprising a rail made of an elongated strip of sheet metal and having its longitudinal edges overlapping, one edge being bent inwardly and then reversely to provide spaced inwardly extending members having a space therebetween, the other edge being bent inwardly and extending into said space.

2. A table comprising a rail made of an elongated strip of sheet metal and having its longitudinal edges overlapping, one edge being bent inwardly and then reversely to provide spaced inwardly extending members having a space therebetween, the other edge being bent inwardly and extending into said space, said edges providing an inwardly extending flange of three thicknesses of material, said flange extending below the upper edge of the rail, and a top supported by said flange substantially flush with the top of the rail.

3. A table comprising a rail made of an elongated strip of sheet metal and having its longitudinal edges overlapping, one edge being bent inwardly and then reversely to provide spaced inwardly extending members having a space therebetween, the other edge being bent inward and extending into said space, and leg supporting members having sides fastened to the rail and having tops engaging one of the inwardly extending members.

4. A table including a square-shaped rail, each length of the rail being made of sheet metal bent to form in cross section a hollow, closed rim having spaced outer and inner walls, a top and a bottom, the outer wall and top being of single thickness and the inner wall being of single thickness except for an inwardly extending multi-thickness flange formed in and by said wall and somewhat below said top, and a leg-supporting and frame reinforcing metal bracket of angular construction having relatively broad angularly disposed sides, the adjacent exterior sides of said bracket being welded to the adjacent inner walls of the rail at the corner thereof, with the top of said bracket positioned immediately under and contiguous to the underside of said inwardly extending flanges, whereby to provide strength, and a table top supported on said flanges.

5. A square sheet metal rail for a table having its four lengths each formed in cross section to provide a hollow, closed rim forming spaced inner and outer, substantially vertical, walls of some depth vertically, and spaced, relatively narrow, top and bottom walls, the outer wall and top being of single thickness and the inner wall including an inwardly extending relatively narrow flange of a plurality of thicknesses, and the bottom wall including a flanged portion, and a rail reinforcing metal bracket having side walls arranged at right angles, disposed in each corner of the square rail, the adjacent angularly disposed side walls of each bracket being welded to the inner vertical adjacent walls of the rail at the corners thereof with the upper portion of each bracket immediately under the bottom of the flanges of the inner rail walls.

6. A table including a table top and a rail made of sheet metal and having spaced apart inner and outer side portions and spaced apart top and bottom portions, the vertical extent of the rail being greater than its lateral extent and the inner side of the rail lying substantially in a vertical plane, a portion of the sheet metal of the rail being inwardly bent to form a flange on the rail extending inwardly and laterally from the inner side thereof at a point spaced downwardly from the top of the rail, said flange serving to support the top and to strengthen the rail laterally.

7. A table including a table top and a rail made of sheet metal and having spaced apart inner and outer side portions and spaced apart top and bottom portions, a flange on the rail extending inwardly and laterally from the inner side thereof at a point spaced downwardly from the top of the rail, said flange serving to support the top and to strengthen the rail laterally, and said rail bottom having associated therewith a downwardly extending strengthening flange for resisting vertical bending.

8. A table including a table top and a rail made of sheet metal and having spaced apart inner and outer side portions and spaced apart top and bottom portions, the vertical extent of the rail being greater than its lateral extent and the inner side of the rail lying substantially in a vertical plane, a flange on the rail extending inwardly and laterally from the inner side thereof at a point spaced downwardly from the top of the rail, said flange serving to support the top and to strengthen the rail laterally, portions of said rail bottom being substantially in contact and extending vertically downwardly substantially in the plane of one of the sides of the rail to form a vertical strengthening flange.

9. A table including a table top and a rail made of sheet metal and having spaced apart inner and outer side portions and spaced apart top and bottom portions, the inner side of the rail lying substantially in a vertical plane except for a portion thereof shaped to form a flange extending inwardly and laterally from the rail at a point spaced downwardly from the top thereof, said flange serving to support the top and to strengthen the rail laterally.

10. A table including a table top and a rail made of sheet metal and having spaced apart inner and outer side portions and spaced apart top and bottom portions, said rail being shaped to form a flange thereon extending inwardly and laterally from the inner side thereof at a point spaced downwardly from the top of the rail, said flange serving to support the top and to strengthen the rail laterally, and said rail also being shaped to form at the bottom thereof a downwardly extending strengthening flange for resisting vertical bending.

11. A portable, light weight and rigid game table having a hollow tubular metallic rim portion supported by collapsible legs, said rim portion having a projecting support comprising an integral rabbeted edge on the inside thereof and below the top surface of the rim portion, and a light weight center portion supported by said projecting rabbet, the projecting rabbet and center portion being of such position and thickness that the center portion is substantially flush with the top of the rim portion, the rim portion being adapted to receive the legs of the table in folded position, substantially within its lower edge, and means to detachably secure said center portion to said projecting rabbet, said center portion being of slightly smaller dimensions than the opening in the rim so that the center portion may be covered and the cover be secured over the edges of the center portion.

12. In a table structure, the combination of a frame comprising a sheet metal tubular rail having integral folds bent inwardly to form a table top support, a table top supported thereon, rigid frame strengthening corner brackets having angularly disposed wall portions, each portion extending parallel to and welded to an adjacent wall portion of the rail at the corner of the rail, and each bracket having an upper portion lying parallel to and welded to the underside of the integral folded portion of the rail.

13. In a table, in combination with a table top, a tubular rail of sheet metal adapted to receive and support said top, said rail having vertical inner and outer walls, the upper portion of the outer wall being curved upwardly and inwardly to strengthen the top of said rail, the bottom portion of at least one of said vertical walls being bent inwardly to meet and contact a length of the opposite vertical wall whereby to strengthen the bottom of the rail, said vertical inner wall of the rail having interengaging laterally extending integral flange portions to form a support for the top of the table and to strengthen the rail thereat, said table top resting upon and being supported by the integral flanges of said rail, and rigid leg supporting corner brackets having right angular portions mounted at the corners of the rail and welded to right angular inner wall portions of the vertical inner walls of said rail to strengthen the rail at the corners.

14. In a table, in combination with a table top, a tubular rail of sheet metal adapted to receive and support said top, said rail having vertical inner and outer walls, the upper portion of the outer wall being curved upwardly and inwardly to strengthen the top of said rail, the bottom of said outer wall being bent angularly inwardly and thence extending downwardly to meet and contact a length of the inner vertical wall whereby to strengthen the bottom of the rail, said vertical inner wall of the rail having interengaging laterally extending integral flange portions to form a support for the top of the table and to strengthen the rail thereat, said table top resting upon and being supported by the integral flanges of said rail, and rigid leg supporting corner brackets having right angled portions mounted at the corners of the rail and welded to right angular inner wall portions of the vertical inner walls of said rail to strengthen the rail at the corners, said leg supporting brackets having upper portions also welded to the undersurfaces of said laterally extending flanges of the rail.

15. A hollow sheet metal rail for a table having spaced inner and outer wall portions and spaced top and bottom portions, the inner wall having portions thereof bent laterally and forming a multiply inwardly extending flange for supporting the table top and for lending rigidity to the rail, the lower portion of the rail being reduced in cross section to lend rigidity to the rail.

16. A table including a table top and a polygonal frame comprising a rail made of sheet metal and having spaced apart inner and outer side portions and spaced apart top and bottom portions, the inner side of the rail lying substantially in a vertical plane, and a continuous flange on the rail extending inwardly and laterally from the inner side thereof at a point spaced downwardly from the top of the rail, said flange being coextensive with the length of the rail, the junctures of said flange at the corners of the frame being rigidly interconnected, said flange serving to support the top and to strengthen the rail laterally.

17. A table including a table top and a polygonal frame comprising a rail made of sheet metal and having spaced apart inner and outer side portions and spaced apart top and bottom portions, the inner side of the rail lying substantially in a vertical plane, a continuous flange on the rail extending inwardly and laterally from the inner side thereof at a point spaced downwardly from the top of the rail, said flange being coextensive with the length of the rail, said flange serving to support the top and to strengthen the rail laterally, and leg-supporting brackets secured to the frame at the corners thereof, each of said brackets being fastened to the inner side of the rail on either side of the corner joint and to the flange whereby to serve as a strengthening means for the frame.

JOHN B. O'CONNOR.